United States Patent [19]

Williams

[11] 4,364,266
[45] Dec. 21, 1982

[54] ENGINE ANALYZER APPARATUS

[76] Inventor: James F. Williams, 25217 Rye Canyon Rd., Valencia, Calif. 91355

[21] Appl. No.: 206,536

[22] Filed: Nov. 13, 1980

[51] Int. Cl.³ ............................................ G01M 15/00
[52] U.S. Cl. ..................................................... 73/115
[58] Field of Search ....................... 73/116, 117.3, 115

[56] References Cited

U.S. PATENT DOCUMENTS 3,463,010 8/1969 Hatschek ......................... 73/115 X
4,311,040 1/1982 Long ..................................... 73/115

FOREIGN PATENT DOCUMENTS 6615070 4/1968 Netherlands ........................... 73/115

*Primary Examiner*—Jerry W. Myracle
*Attorney, Agent, or Firm*—Lyon & Lyon

[57] ABSTRACT

An engine analyzer apparatus for use with large internal combustion engines in which a self-closing ball valve is permanently installed on each engine cylinder and an air-cooled adapter may be selectively connected to each valve for communicating the engine cylinder pressure to a transducer while protecting the transducer from overheating and without influencing the operation of the engine. The adapter is cooled principally by compressed air but controlled amounts of water may be injected for additional cooling. An unloading device may be mounted on the ball valve for selectively unloading an engine cylinder during testing.

20 Claims, 6 Drawing Figures

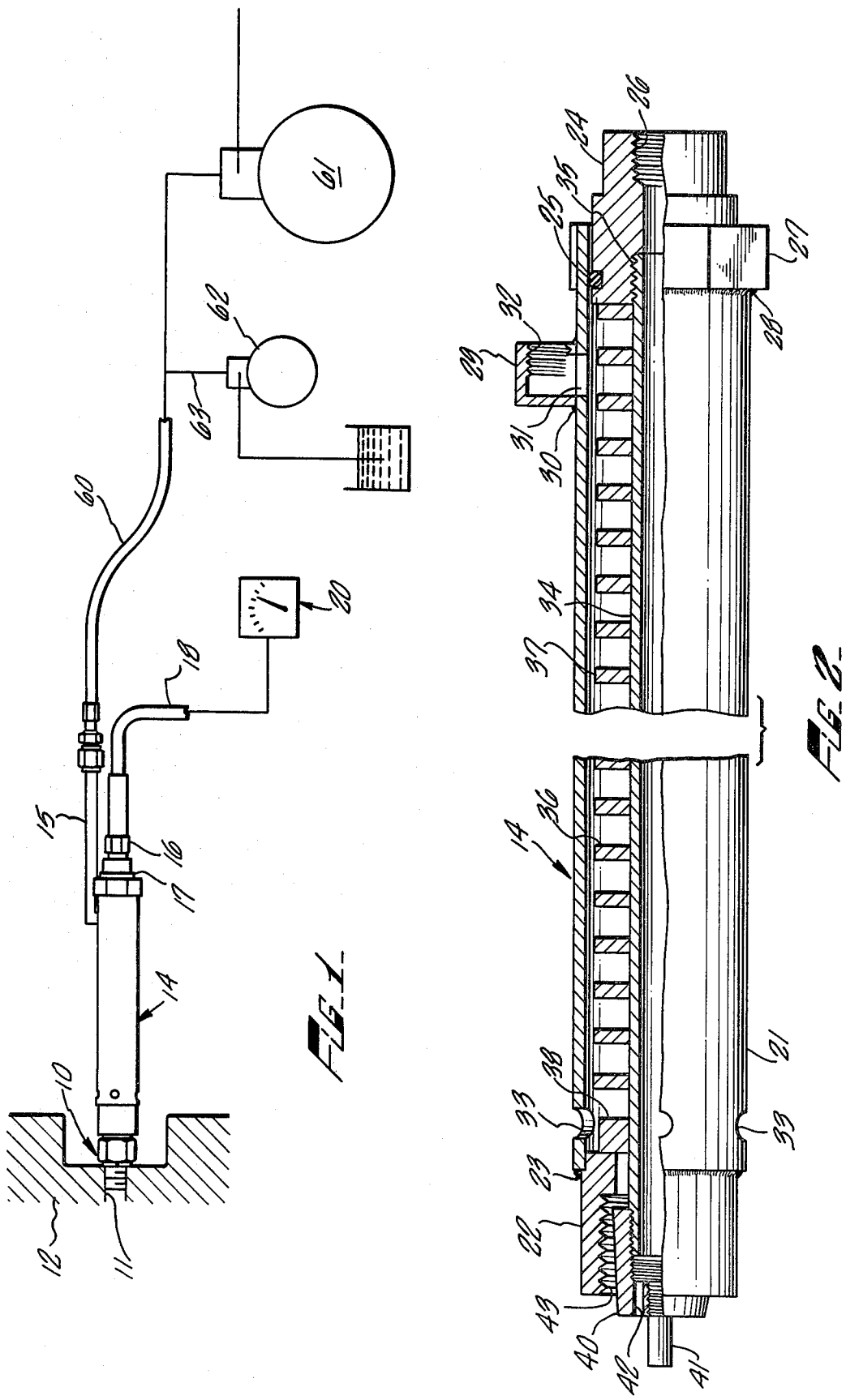

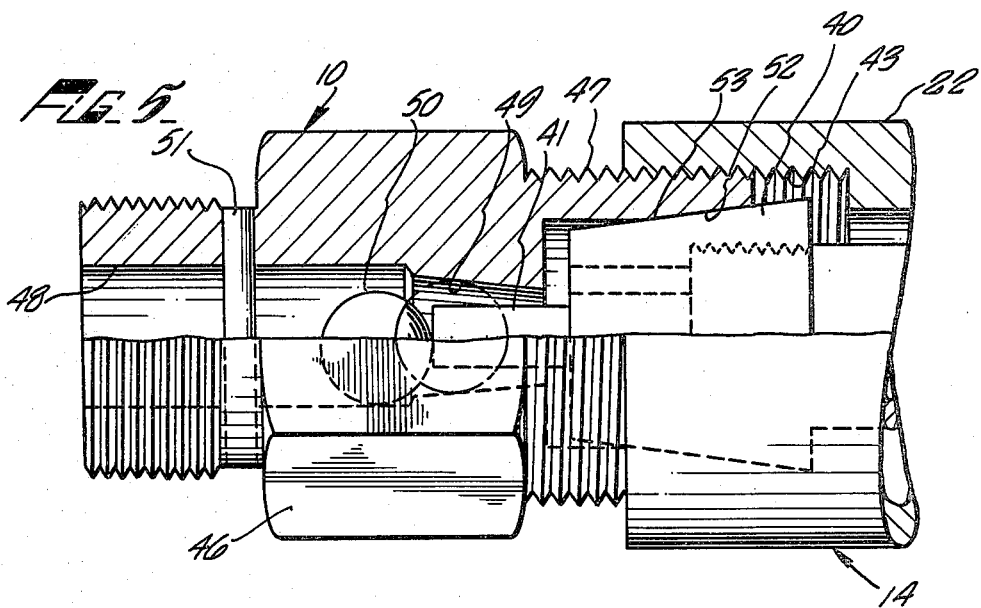
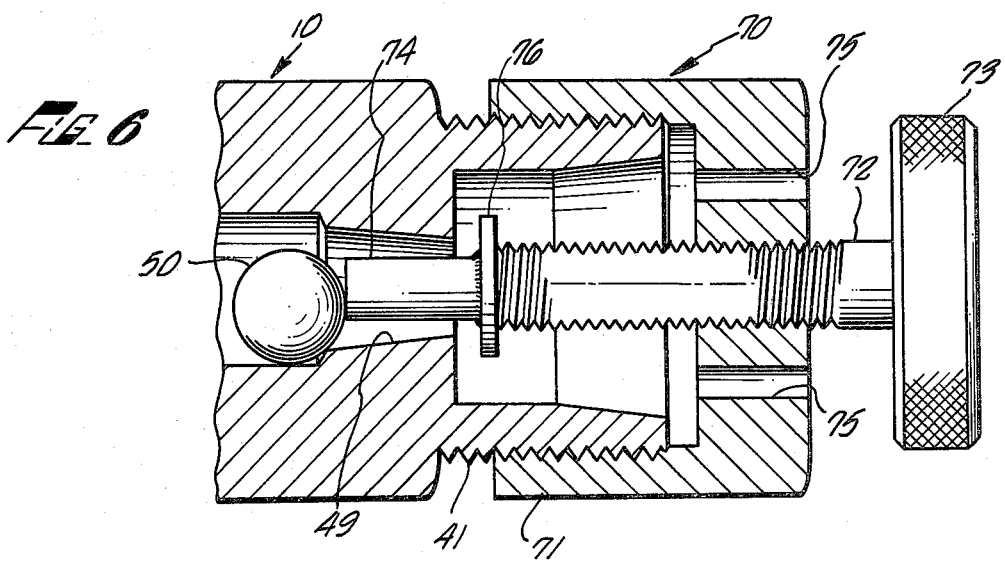
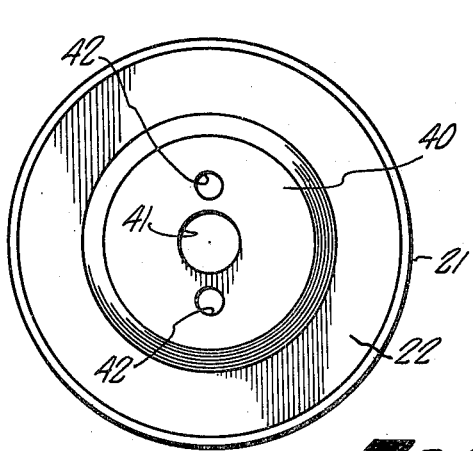
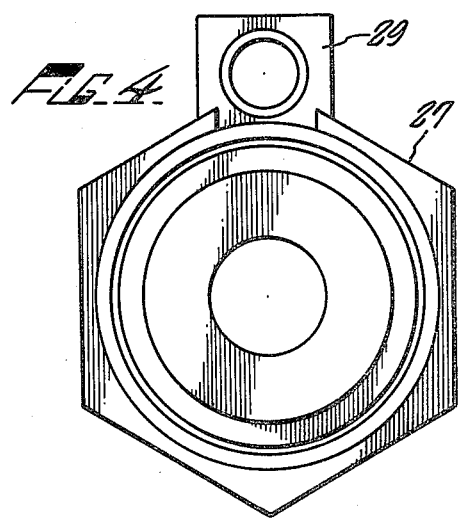

ENGINE ANALYZER APPARATUS

BACKGROUND AND SUMMARY OF THE INVENTION

This invention relates to apparatus for use with internal combustion engines and compressors for testing and analyzing the operation of the engine. It is relatively conventional to test the compression or pressure in the cylinders of internal combustion engines or compressors to determine whether or not each cylinder is functioning properly, and, if not, the probable cause of the malfunction. Compression testing of automobile internal combustion engines is relatively simple but the power testing of internal combustion engines under load is substantially more difficult and critical due to the higher temperatures and pressures involved. Some industrial engines and compressors are supplied with a separate port on each cylinder to which a test apparatus may be attached periodically for analyzing the pressure variations in that cylinder during normal operation of the engine. Occasionally, test ports are installed in other engines and compressors after they are operational. Various types of connectors and transducers have been used to attempt to obtain reliable pressure testing through such ports on industrial engines but numerous difficulties and disadvantages exist with respect to all of the prior devices. Some prior devices require the engine to be stopped between the testing of each cylinder for installing and removing the test apparatus. Some devices have used valves connected to the ports in an attempt to avoid the necessity of stopping the engine between cylinder tests but such valves generally have been unsatisfactory due to sticking or leaking because of the extreme temperatures and pressures and because of carbon buildup in the long clearance pocket created. Still other devices have been very difficult to install and remove due to the design of the engine and the heat generated. Many of the prior devices become overheated during use and cause improper glow plug detonation during operation thereby adversely influencing the test results and the engine operation.

Another problem that has been encountered with prior engine testing equipment is that the pressure transducers installed on the engine which develop the pressure signal transmitted to the visual or printed readout equipment are subjected to such high temperatures that the expensive transducers have exhibited a rather short useful life. Some transducers have been constructed with means for supplying compressed air through the transducer to reduce the overheating but such arrangement has not eliminated the problem. Moreover, the numerous different types of engines with their different types of test ports as well as the numerous different types of transducers have heretofore precluded any standardized or uniform solution to the various problems of engine analyzers.

It is an object of this invention to provide a novel form of engine analyzer apparatus which employs a valve means installed on each cylinder and an adapter for connecting between the valve means and the transducer with means for supplying a cooling fluid to the adapter to eliminate overheating of the transducer and glow plug detonation during testing. It is a further object of this invention to provide means for injecting water in the compressed air supplied as the cooling fluid to the adapter for supplementing the cooling under extreme conditions. A still further object of this invention is to provide the apparatus with a valve means which is easily and automatically opened by installation of the adapter and automatically and reliably closes upon removal of the adapter without any additional manipulation. Still another object of this invention is to provide an unloading device that is operable with the valve for unloading an engine cylinder.

DESCRIPTION OF THE DRAWINGS

FIG. 1 is a schematic view of the engine analyzer apparatus of this invention installed on an engine and including the support equipment.

FIG. 2 is an elevation view of the adapter of the engine analyzer apparatus of this invention with portions shown in section.

FIG. 3 is an enlarged end view of the front end of the adapter illustrated in FIG. 2.

FIG. 4 is an enlarged end view of the rear end of the adapter illustrated in FIG. 2.

FIG. 5 is an enlarged elevation view with portions in section illustrating the connection of the front end of the adapter of FIG. 2 to the valve means of this invention.

FIG. 6 is an enlarged sectional view similar to FIG. 5 illustrating a relief valve device installed on the valve means.

DESCRIPTION OF THE PREFERRED EMBODIMENT

Referring to FIG. 1, the engine analyzer apparatus of this invention includes a valve means, generally designated 10, threadedly connected to the conventional port 11 in the cylinder head 12 of an industrial internal combustion engine. During testing of that cylinder, the adapter, generally designated 14, of this invention is threadedly connected to the valve means 10 and extends outwardly from the engine. The adapter 14 is provided with a coolant supply tube 15 through which the cooling fluid, either air or a mixture of air and water, is supplied to the adapter 14 in a manner hereinafter described more fully. A conventional transducer 16 is connected to the rear end 17 of adapter 14 and a line 18 connects the transducer to the conventional analyzing equipment, generally designated 20, which may comprise a visual oscilloscope display unit, a chart printer or any similar equipment.

Referring to FIG. 2, the adapter 14 includes a tubular housing 21 permanently connected at its front end to a fitting 22 such as by welding 23. At the rear end of the adapter 14 the housing 21 is slidably mounted on a second fitting 24 which is provided with an O ring 25 for sealing between the interior of the housing 21 and the fitting 24. The fitting 24 is provided with internal threads 26 for mounting the transducer 16 and the type and size of the threads 26 are selected to accommodate the particular transducer employed by that operator. A hexagonal ring 27 is mounted on the exterior of housing 21 such as by welding 28 to accommodate a wrench for rotating the housing during installation and removal of the adapter 14. A fitting 29 is mounted on the exterior wall of housing 21 by welding 30 at an inlet opening 31 in the housing wall. The fitting 29 is threaded at 32 for connection to the coolant supply tube 15. The forward end of the housing 21 is provided with a plurality of exhaust ports 33, four of which are shown, for discharge of the coolant to atmosphere.

A pressure tube 34 is positioned concentrically within the tubular housing 21 and has one end threadedly connected at 35 to fitting 24. A multiplicity of cooling fins 36 are mounted on the exterior of tube 34 and have an outside diameter 37 slightly less than the inside diameter of the housing 21 to allow the coolant to flow from the inlet opening 31 in the wall of the housing 21 along the length of the adapter to the exhaust ports 33. The last cooling fin or ring 38 on the tube 34 is positioned such that upon installation of the fitting 22 the tube 34 is snugly retained within the housing. A tapered plug 40 is threadedly mounted on the forward end of the tube 34 and protrudes slightly beyond the fitting 22. A pin 41 is threadedly connected to the forward end of and protrudes from the tapered plug 40. Fluid passage means are provided through plug 40 to the interior of the pressure tube 34 and, as shown in the drawings, such means may include a pair of ports or longitudinal holes 42 extending through the plug. The forward fitting 22 is provided with an internal thread 43 and the interrelationship of that thread, the tapered plug 40 and the pin 41 will appear more fully hereinafter.

Referring to FIG. 5, the valve means 10 for installation in the test port 11 of the engine cylinder head is illustrated more fully with the forward end of the adapter 14. The valve includes a thread 45 for threadedly engaging the bore 11 in the cylinder head and an hexagonal exterior 46 is provided for installing and removing the valve. The rear end of valve 10 is provided with a thread 47 for threaded connection to the threads 43 of fitting 22 on the adapter 14. Valve 10 is provided with an internal bore 48 communicating with the engine cylinder and has a tapered portion 49 of reduced diameter in which the taper diverges in the direction toward the engine, i.e., toward thread 45. A ball 50 preferably of tungsten carbide is positioned within bore 48 and is of a size to fit into and seal the tapered portion 49 of the bore. It has been found that a taper of about 5 degrees relative to the axis (i.e., 10 degrees total) is most advantageous in that sealing without dropping out when the engine pressure is released but the ball will not become so tightly wedged that it cannot be dislodged in the manner hereinafter described. A pin 51 extends across the bore 48 in front of the ball 50 to retain the ball within the valve. The rear end of valve 10 is provided with a tapered bore 52 for mating with the external tapered surface 53 of the tapered plug 40 to create a pressure seal. It is preferred that the tapers on bore 52 and surface 53 be approximately 3.5 degrees relative to the axis.

In operation a valve 10 is mounted in each cylinder of the internal combustion engine which is equipped for testing by the apparatus of this invention. A protective cap, not shown, is normally mounted on the threads 47 of valve 10 and is removed for the testing procedure. The adapter 14 is threaded onto valve 10 with threads 43 of fitting 22 engaging the threads 47 of valve 10. As threading of the adapter 14 onto the valve 10 progresses the pin 41 engages the ball 50 to dislodge the ball from the tapered bore 49 and the tapered plug 40 engages the tapered bore 52 of the valve to create an airtight seal as the adapter is tightened further by using the hexagonal ring 27 at the rear end. All of this is conveniently accomplished while the engine is operating without adversely affecting such operation and with complete safety. With the ball 50 dislodged from the tapered bore 49 the gas pressure from the engine cylinder is communicated along a first fluid passage in the adapter through bore 48 of valve 10, then through ports 42 in tapered plug 40, then through pressure tube 34 to the fitting 24, and finally to the transducer 16. A supply of compressed air is provided through line 60 from air compressor 61 to the tube 15 and along a second fluid passage in the adapter through fitting 29 and inlet opening 31 to the interior of housing 21 and past the cooling fins 36 of pressure tube 34 to the exhaust ports 33. This serves to cool the engine gases communicated from the engine cylinder to the transducer thereby protecting the transducer without influencing the test results. Similarly, since the adapter 14 is well cooled it does not create a glow plug detonation problem that has existed with certain prior devices. While normally a supply of compressed air to the adapter is adequate to provide the desired cooling, it has been found that certain engines develop unusually high temperatures whereby added cooling is desirable. For such purposes a controlled supply of water is added to the compressed air by a metering or injector type pump 62 connected by line 63 to the compressed air line 60 leading to the adapter 14. This small amount of water carried by the compressed air extracts additional heat from the adapter 14 by being vaporized within the coolant flow passage between the housing 21 and the pressure tube 34. The water vapor is discharged with the compressed air through the exhaust ports 33. It has been found that injecting variable amounts of water up to about one-half gallon per hour is normally adequate for all cooling requirements. When the test on that cylinder has been completed, the adapter 14 is unthreaded from the valve 10 and as the pin 41 retracts the ball 50 resumes its seated position shown in phantom lines in FIG. 5. The protective cap can be replaced and the adapter installed on the next cylinder for testing.

In the testing or analyzing of large industrial internal combustion engines, it has been found advantageous to "unload" one or more of the cylinders for various reasons. In the past this has been done in various manners such as by removing the spark plug or the fitting from the test port but such methods are inconvenient in many respects. By this invention, there is also provided a device for unloading an engine cylinder that is used in conjunction with the permanently installed valve means 10 on each cylinder as shown in FIG. 6. The unloading device, generally designated 70 includes a threaded cap 71 adapter to be mounted on the threads 47 of valve 10. A stem 72 is threadedly mounted on the axis of the end cap 71. The stem 72 has a knob 73 on the exterior end and a protruding pin 74 at the forward end. The end cap is provided with ports 75 surrounding the stem. With the threaded stem 72 in a retractive position the end cap 71 may be threadedly installed on the valve 10 whereupon the knob 73 may be rotated to advance the stem 72 until the pin 74 dislodges the ball 50 from the tapered bore 49 to allow the gas pressure from inside the engine cylinder to pass through the valve 10 and out the ports 75 in the end cap. When unloading is no longer desired, the knob 73 is rotated in the opposite direction to retract the pin 74 and allow the ball 50 to again seat in the tapered bore 49. A flange 76 is permanently fixed on the stem 72 to prevent complete unthreading of the stem 72 from the end cap 71 for safety.

From the foregoing description it may be seen that the engine analyzer apparatus of this invention is readily adaptable to all engines and solves the deficiencies and problems with prior analyzer devices. The valve means 10 may be of an appropriate length and have the appropriate threading to match any internal combustion engine test port. Similarly the thread 26 of fitting 24 on the adapter 14 may be appropriately specified to accommodate any type of analyzer transducer. The valve 10, adapter 14 and unloaded 70 provide the means for readily and safely analyzing the operation of any internal combustion engine having analyzer ports for each cylinder. While the invention has been described with particularity relative to the preferred embodiment, it is to be understood that the invention is not necessarily limited to the details of such embodiment but rather is of the full scope of the appended claims.

What is claimed is:

1. An apparatus for use with an engine analyzer system employing a transducer responsive to the characteristic being analyzed, the combination of:
    an adapter means including means for releasable connection between the engine and the transducer and physically separating the transducer from the engine;
    said adapter having a first fluid passage means therethrough communicating the engine with the transducer and a second fluid passage means therethrough in heat exchange relationship with and separate from said first fluid passage means, said second fluid passage means having an inlet located near said transducer and an outlet located adjacent said means for releasable connection; and
    means for supplying a fluid through said second fluid passage means from said inlet to said outlet for cooling the adapter and the gas in communication with the transducer to provide maximum cooling at the transducer to prevent damage to the transducer.

2. The apparatus of claim 1 wherein the first fluid passage means includes an elongated tube with external cooling fins and the second fluid passage means includes a tubular housing surrounding said tube and closely spaced from said fins.

3. The apparatus of claim 2 wherein said tubular housing has an inlet near the end of the adapter adjacent the transducer for the cooling fluid to enter and exhaust ports in the other end for the discharge of the fluid to the atmosphere.

4. The apparatus of claims 1, 2 or 3 wherein the means for supplying fluid includes an air compressor for providing a continuous supply of cooling air.

5. An apparatus for use with an engine analyzer system employing a transducer responsive to the characteristic being analyzed the combination of:
    an adapter means including means for releasable connection between the engine and the transducer and physically separating the transducer from the engine;
    said adapter having a first fluid passage means therethrough communicating the engine with the transducer and a second fluid passage means therethrough in heat exchange relationship with and separate from said first fluid passage means; and
    means for supplying a fluid to said second fluid passage means for cooling the adapter and the gas in communication with the transducer to prevent abnormal operation of the engine and damage to the transducer, said means for supplying fluid for cooling including an air compressor and a selectively operable water injection pump for providing a continuous supply of cooling air and selectively adding variable amounts of water to the air supply.

6. The apparatus of claim 5 wherein the first fluid passage means includes an elongated tube with external cooling fins and the second passage means includes a tubular housing surrounding said tube and closely spaced from said fins.

7. The apparatus of claim 5 wherein said tubular housing has an inlet near the end of the adapter adjacent the transducer for the cooling fluid to enter and exhaust ports in the end near the engine for the discharge of the fluid to the atmosphere.

8. In an engine analyzer apparatus for use with a transducer responsive to the characteristic being analyzed, the combination of:
    a valve means for mounting on the engine;
    an adapter means including means for releasable connection to said valve means;
    said adapter having a first fluid passage means therethrough for communicating the said valve means with the transducer and a second fluid passage means therethrough in heat exchange relationship with and separate from said first fluid passage means, said second fluid passage means having an inlet located near said transducer and an outlet located adjacent said means for releasable connection to the engine; and
    means for supplying a fluid through said second fluid passage means from said inlet to said outlet for maximum cooling of said transducer by the incoming fluid while cooling the first fluid passage means and the gas therein to prevent abnormal operation of the engine and damage to the transducer.

9. The apparatus of claim 8 wherein the valve means is normally closed and the adapter means includes means for actuating the valve means to the open position upon installation of the adapter means on the valve means.

10. The apparatus of claims 8 or 9 wherein the adapter means includes two elongated tubular means of different sizes positioned concentrically with the two fluid passage means being formed by the interior of the inner tubular means and the annular space between the two tubular means.

11. The apparatus of claim 8 wherein said second fluid passage means includes an inlet in the adapter near the transducer for the cooling fluid to enter near the transducer and exhaust ports near the other end of the adapter for discharging the cooling fluid to the atmosphere.

12. In an engine analyzer apparatus for use with a transducer responsive to the characteristic being analyzed, the combination of:
    a normally closed valve means for mounting on each cylinder of the engine;
    an adapter means including means for releasable connection to any one of said valve means;
    said adapter having a first fluid passage means therethrough for communicating the said valve means with the transducer and a second fluid passage means therethrough in heat exchange relationship with and separate from said first fluid passage means;
    means for supplying a fluid to said second fluid passage means for cooling the first fluid passage means and the gas therein to prevent abnormal operation of the engine and damage to the transducer; and
    an unloading means separate from said adapter for selective installation on any one of said valve means and which includes means for selectively opening the valve means to exhaust that engine cylinder to atmosphere.

13. In an engine analyzer apparatus for use with a transducer responsive to the characteristic being analyzed, the combination of:
   a valve means for mounting on the engine;
   an adapter means including means for releasable connection to said valve means;
   said adapter having a first fluid passage means therethrough for communicating the said valve means with the transducer and a second fluid passage means therethrough in heat exchange relationship with and separate from said first fluid passage means; and
   means for supplying a fluid to said second fluid passage means including means for supplying compressed air and selectively supplying variable amounts of water with the compressed air for cooling the first fluid passage means and the gas therein to prevent abnormal operation of the engine and damage to the transducer.

14. In an engine analyzer apparatus for use with a pressure transducer means, the combination of a valve means for mounting on the engine in communication with an engine cylinder including a valve body with a central tapered bore diverging toward the engine, a ball positioned in said bore for sealing engagement therewith by pressure from the engine, and means retaining the ball in the bore;
   an adapter means including means on one end for releasable connection to said valve means and a projecting pin means for unsealing said ball from said tapered bore upon said connection and means on the other end for mounting the transducer means;
   said adapter means having a first fluid passage therethrough in communication with said valve means on the one end and with the transducer means on the other end and a second fluid passage means therethrough in heat exchange relationship with and separate from said first fluid passage means; and
   means for supplying a fluid to said second fluid passage means for cooling the adapter and the gas communication from the engine to prevent abnormal operation of the engine and damage to the transducer means.

15. The apparatus of claim 14 wherein the adapter means includes an elongated tube forming said first fluid passage means and an outer tubular housing surrounding said tube to form the second fluid passage means in the annular space therebetween, said tube having external fins thereon projecting into the annular space for cooling the tube.

16. The apparatus of claim 15 wherein the tubular housing has an inlet near the end closer to the transducer for the cooling fluid to enter and an outlet at the end closer to the engine to cause the fluid to flow from end to end within the annular space.

17. The apparatus of claim 14 wherein an unloading valve means is provided for selective connection to said valve means and includes selectively operable means for unsealing said ball to exhaust the engine to atmosphere.

18. The apparatus of claim 14 wherein the valve means is provided with a second tapered bore facing and diverging outwardly from the engine and the adapter means includes a tapered means on the said one end for sealing engagement with said second tapered bore on the valve means upon connection of the adapter means to the valve means.

19. The apparatus of claim 18 wherein the second tapered bore in the valve means has approximately 3.5° taper relative to the axis.

20. The apparatus of claims 14 or 19 wherein the tapered bore has approximately 5° taper relate to the axis.

* * * * *